United States Patent [19]

Okajima et al.

[11] Patent Number: 4,980,829
[45] Date of Patent: Dec. 25, 1990

[54] METHOD AND SYSTEM FOR LANGUAGE TRANSLATION

[75] Inventors: Atsushi Okajima, Yokohama; Fumiyuki Yamano, Kawasaki; Eri Katagiri, Yokohama; Noriyuki Yamasaki, Yokohama; Yuichi Inaba, Yokohama, all of Japan

[73] Assignee: Hitachi, Ltd., Tokyo, Japan

[21] Appl. No.: 166,519

[22] Filed: Mar. 10, 1988

[30] Foreign Application Priority Data

Mar. 13, 1987 [JP] Japan .................. 62-56579

[51] Int. Cl.⁵ .......................................... G06F 15/38
[52] U.S. Cl. .................. 364/419; 364/226.4; 364/920.4; 364/200; 364/900; 434/157
[58] Field of Search .............. 364/419, 226.4, 920.4; 434/157

[56] References Cited

U.S. PATENT DOCUMENTS

| 4,502,128 | 2/1985 | Okajima et al. | 364/900 |
| 4,507,750 | 3/1985 | Frantz et al. | 364/900 |
| 4,586,160 | 4/1986 | Amano et al. | 364/900 |
| 4,661,924 | 4/1987 | Okamoto et al. | 364/900 |
| 4,706,212 | 11/1987 | Toma | 364/900 |
| 4,730,270 | 3/1988 | Okajima et al. | 364/900 |

FOREIGN PATENT DOCUMENTS

| 232257 | 7/1985 | Japan | 364/419 |
| 143178 | 6/1987 | Japan | 364/419 |

Primary Examiner—Jerry Smith
Assistant Examiner—Steven G. Kibby
Attorney, Agent, or Firm—Antonelli, Terry, Stout & Kraus

[57] ABSTRACT

A machine translation system capable of performing translation at a high processing speed with improved disambiguation rate in the parsing by applying grammar rules in dependence on the domains to which texts to be translated belong, objects of the texts and rules of sentences in the same text. The machine-translation system for translating a first language to a second language uses a grammer memory for storing grammar rules of the first or second language and a main memory for storing a variety of information, wherein the grammar rules stored in the grammar memory are prepared in groups at least on the basis of the domains to which texts to be translated belong and individual parts in the text. The system includes apparatus for deciding which of the grammar rules stored in the grammar memory should be applied to a given input text, and apparatus for translating the individual parts of the input text by applying the grammar rules determined on the basis of the result of decision made by the deciding apparatus.

5 Claims, 9 Drawing Sheets

FIG. 3
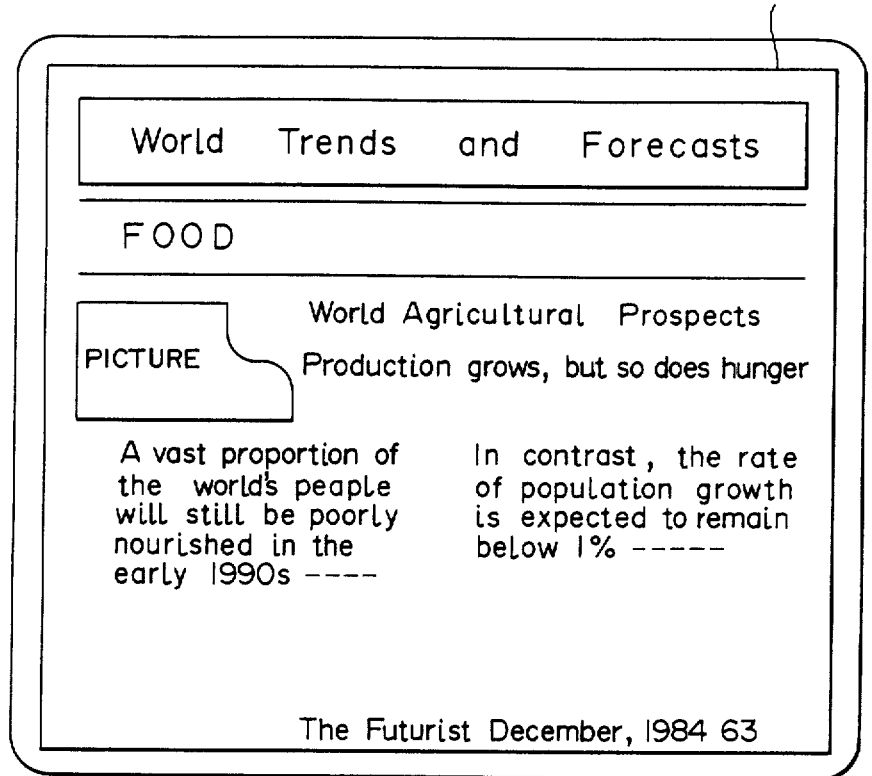
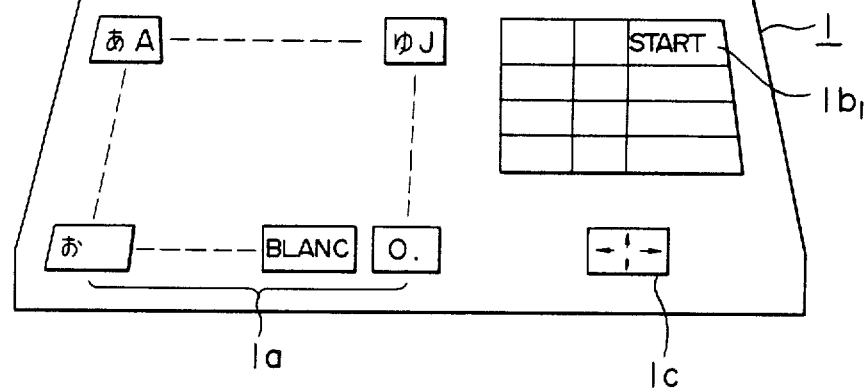

| DOMAIN CODE | DOMAIN |
|---|---|
| 1 | PERIODICAL |
| 2 | NEWSPAPER |
| 3 | ARTICLE |
| 4 | MANUAL |
| 5 | ADVERTISEMENT |
| ⋮ | ⋮ |

| PART CODE | PART IN TEXT |
|---|---|
| 1 | DOMAIN |
| 2 | SUBDOMAIN |
| 3 | TITLE |
| 4 | SUBTITLE |
| 5 | NAME OF AUTHOR |
| 6 | INSTITUTE |
| 7 | BODY OF TEXT |
| 8 | TITLE OF PICTURE |
| 9 | NOTES |
| 10 | PAGE NO. |

FIG. 8

| PATTERN NO. | GRAPHIC ATTRIBUTE | | SENTENCE NO. | SENTENCE ATTRIBUTE | |
|---|---|---|---|---|---|
| | POINT | STYLE | | DOMAIN | PART |
| 1 | 16 | B | 1 | 1 | 1 |
| 2 | 14 | B | 2 | 1 | 2 |
| 3 | 12 | B | 3 | 1 | 3 |
| 4 | 12 | B | 4 | 1 | 4 |
| 5 | 10 | E | 5 | 1 | 7 |

FIG. 9

| RULE NO. | GRAMMAR RULES |
|---|---|
| 1 | "NOUN-PHRASE PREDICATE" IS ASSEMBLED TO A SENTENCE |
| 2 | "VERB-PHRASE NOUN-PHRASE" IS ASSEMBLED TO A PREDICATE |
| 3 | SENTENCE CONSISTING ONLY OF A WORD WHICH IS MULTIPLE-PART-OF-SPEECH USABLE AS NOUN OR VERB ARE HANDLED AS NOUN |
| 4 | WHEN ASSEMBLED SENTENCE LACKS VERB, A MULTIPLE-PART-OF-SPEECH WORD USABLE AS VERB IS SEARCHED AND USED AS VERB |
| 5 | FOR MULTIPLE-PART-OF-SPEECH WORD USABLE AS NOUN OR VERB, PREFERENCE IS PLACED TO NOUN |
| ⋮ | |
| 100 | "ARTICLE NOUN" IS ASSEMBLED TO A NOUN-PHRASE |

| CLASSIFICATION OF GRAMMAR RULES | | GRAMMAR RULES | | | | | |
|---|---|---|---|---|---|---|---|
| DOMAIN | PART | | | | | | |
| 1 | 1 | 1 | 3 | 5 | --- | | |
| 1 | 3 | 1 | 2 | 5 | --- | | |
| ⋮ | ⋮ | | | | | | |
| 1 | 7 | 1 | 2 | 4 | --- | 100 | --- |

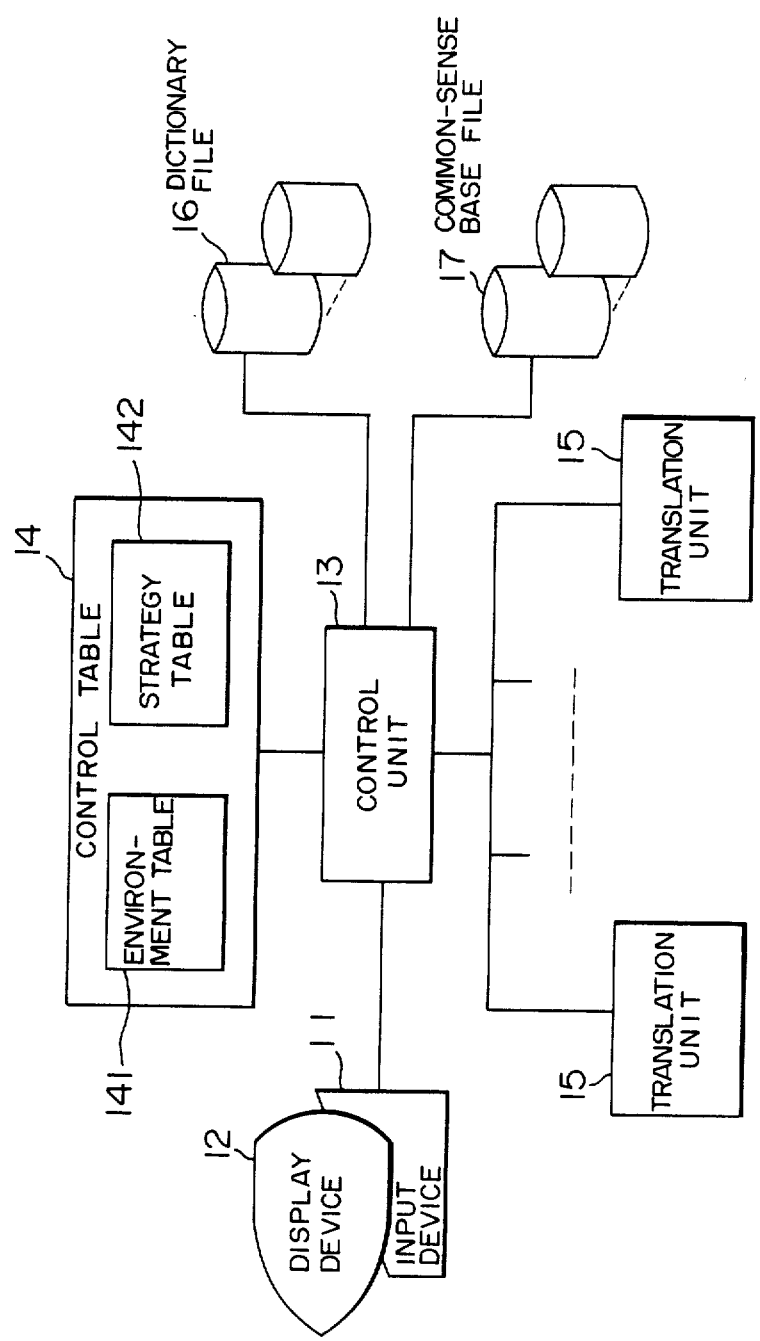
F I G. 13

FIG. 14

| CHARACTERISTIC OF TEXT | | INPUT MEANS | | | DICTIONARY | | | |
|---|---|---|---|---|---|---|---|---|
| DOMAIN | TEXT | VOICE | OCR | FILE | 1 | 2 | 3 | 4 |
| SCIENCE | MANUALS | ○ | ○ | 1 | ○ | 1 | ○ | ○ |

FIG. 15

| SPEED/ QUALITY | DICTIONARY DOMAIN | RULE LIMITATION | MEANING PROCESSING LEVEL | DISAMBIGUATION RESULT DISPLAY | CONSIDERATION OF CORRESPONDENCE | COMMON-SENSE BASE |
|---|---|---|---|---|---|---|
| SPEED | SCIENCE | ON | 2 | ON | OFF | OFF |

142

METHOD AND SYSTEM FOR LANGUAGE TRANSLATION

BACKGROUND OF THE INVENTION

1. Field of the Invention

The present invention generally relates to a language translation system. More particularly, the invention is concerned with a machine translation system for translating sentences described in a first language into sentences described in a second language, which translation system is preferably suited for translating with high efficiency a text which is composed of a plurality of components such as title (headline), summary, body sentences and others as in the case of articles found in periodicals, newspapers and the like.

2. Description of the Prior Art

At present, studies and development of machine- or computer-translation systems for translating Japanese into English sentences or reversely English into Japanese sentences are actively in progress. So far as the texts directed to the subject matters or objects belonging to a particular domain such as those of technical reports and manuals or the like are concerned, the machine translation technique has already reached such a level at which the sentences resulting from the machine translation can be meaningfully used although some correction through manual procedure by the user is often required after the translation.

The hitherto known translation systems can be classified into four categories mentioned below in dependence on the domains of the objects for translation.

1. A so-called electronic-dictionary based translation in which the translation is performed with reference to a dictionary on the word basis.

2. A translation which is performed on the basis of template sentences stored in the form of sentences. The translation performed by replacing some words of the template sentence by other word(s) falls within this second category.

3. A translation relying on the parsing of a complicated sentence of given patterns.

4. A translation directed not only to the sentence but also to a text as a whole (i.e. a meaningful set of sentences). The translation technique of this category is now in the course of being developed as a part of artificial intelligence (AI) systems for making it possible to analyze and understand the context among the sentences and discourse. Assuming, by way of example, that a sentence "He . . . " is given, the translation of this fourth category is to be performed in such a manner in which who is indicated by "He" can be explicitly understood by parsing the context relative to the preceding sentences.

On the other hand, in conjunction with the method of analyzing a sentence or a set of correlated sentences (commonly referred to as the parsing of sentence or sentences), descriptive methods standardized as far as possible have been adopted for the purpose of facilitating the handling of grammar rules. By way of example, rewriting rules that a string of "article noun" be handled as a "noun phrase" and so forth are adopted to assemble the components of sentence. When the resulting "sentence" has proved to be meaningful, it is decided that the parsing has been carried out successfully and correctly. This type of parsing based on the rewriting rules is commonly adopted. Further, there have been known a method according to which the rules applied to the endings of words for conjugation thereof are handled separately and distinctively from the rules to be applied to the words and phrases in such a manner that "noun-phrase verb-phrase" is considered to be "a sentence", and a method according to which different groups of rules are applied in the flow of translation processing such that a group of rules are applied to the parsing of input language while another group of different rules is employed in creation of the output language.

Besides, such a viewpoint that the grammar should be considered to differ in dependence on the domains of the objects for translation is admitted by the grammarians (Reference may be made, for example, to R. Quirk et al "A Grammar of Contemporary English, Section 7, 90, Block Language" Longman, 1972).

Additionally, such a method may be adopted in which the ambiguities encountered in the parsing are eliminated by utilizing the section numbers and indexes as clues for the purpose of disambiguation in addition to the grammar rules (although some problem will arise with respect to the manner in which the section numbers and the indexes are handled). As an example of such method, there may be mentioned the one disclosed in Hirose et al's article entitled "Source Form Analysis in English-Japanese Machine Translation System" contained in the collection of lectures at the 28-th National Conference of the Information Processing Society of Japan, pp. 903-904.

With the above methods, however, the user view point is not yet fully satisfied as to what function is to be seriously considered in translation.

There is also known a method as disclosed in Japanese Patent Unexamined Publication No. 59-223883 which has been proposed to meet the requirements of high quality translation to analyze and understand a profound meaning of sentence(s). According to this method, the domain of the object for translation as well as the sentences thereof are narrowly limited to the extent that there occurs no ambiguity of sentence structure and meaning, or in other words to the extent that the gaps among template sentences are filled, to thereby realize high quality translation. This method is hard to process a text belonging to a domain even with a slight difference from the narrowed domain so that it can hardly be applied to a translation system which cannot limit the domain of a source text. Further, since there is almost no ambiguity in the parsing if the meaning is narrowly limited, the text translated using only a simple rewriting rule (e.g., a rule of handling a string of "article+ adjective+noun" as a "noun phrase") can be used as a meaningful draft, without necessity of a meaning processing.

On the other hand, in case where a free translation is desired or an answer is requested for an inquiry, an expression particularly defining the meaning to some degree becomes necessary. This results in a very large number of meaning domain models while necessitating to eliminate the ambiguities among those meanings. However, some users may desire to take prominence to the speed of translation rather than eliminating meaning ambiguities. Conventional methods have not considered such case.

SUMMARY OF THE INVENTION

An object of the present invention is to provide a language translation system which solves the shortcomings of the prior art systems and provides an enhanced processing efficiency and in which the rate of disambiguation in the parsing can be improved by applying the grammar rules which are prepared in dependence on the subjects or domains to which the sentences or text to be translated belong and the roles of individual parts in the same text.

Another object of the present invention is to provide a translation system capable of translating a text at high speed and with high quality while satisfying a user requirement by taking prominence to the user view point which the prior art has not considered heretofore.

In view of the above object, there is provided according to an aspect of the present invention a machine translation system for machine-translating a first language to a second language by using a grammar memory storing a set of grammar rules of the first or second language together with a main memory storing various types of information, wherein the set of grammar rules stored in the grammar memory are established distinctively in dependence on at least the domain to which the subject matter or object for translation belongs and parts of the text subjected to the translation, which system includes means for deciding which of the grammar rules stored in the grammar memory should be applied to the input sentence, and means for determining the application of the grammar rules on the basis of the result of the decision made by the abovementioned deciding means to thereby translate the individual parts of the input sentence on the basis of the abovementioned grammar rules.

There is provided according to another aspect of the present invention a translation system wherein a strategy table is provided for storing items in accordance with which the translation system operates by taking prominence to the user view point, the strategies are displayed to prompt the user to designate them, and a dictionary file is changed based on the designated strategies.

BRIEF DESCRIPTION OF THE DRAWINGS

FIG. 3 is a view showing a structure of an input device and a display device of the system shown in FIG. 2;

FIG. 8 is a view showing, by way of example, a pattern-versus-sentence correspondence table prepared through the processing shown in FIG. 5;

FIG. 9 is a view showing, by way of example, the contents of a grammar file employed in the illustrative machine translation system;

FIG. 13 is a block diagram of the translation system;

FIG. 14 shows an example of the environment table; and

FIG. 15 shows an example of the strategy table.

DESCRIPTION OF THE PREFERRED EMBODIMENTS

Figure 1:
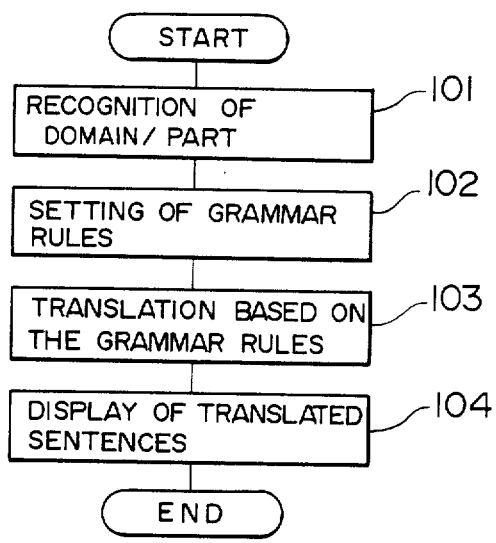
FIG. 1 is a view showing in a flow chart a processing for carrying out the translation method according to an embodiment of the present invention.

Now, the invention will be described in detail in conjunction with an exemplary embodiment thereof by referring to the drawings.

In the first place, the principle underlying the present invention will be briefly elucidated.

According to the teaching of the present invention, a machine translation system is equipped with control means for establishing sets of grammar rules distinctively in dependence on the domains to which the objects of texts to be translated belong and the parts or components constituting the text, and means for designating or commanding the parts of the text to which the grammar rules are to be individually applied. In addition, means for recognizing differences among the domains of the objects or subject matters of the texts and among the parts of the text is provided, wherein the application of the grammar rules is controlled in accordance with the information available from the recognizing means to thereby allow the number of applicable grammar rules to be significantly reduced. In this way, the parsing can be accomplished at a high speed with reduced ambiguity. In this conjunction, it will be appreciated that the syntactical ambiguity is more intensified as the number of the applicable grammar rules is increased.

Figure 2:
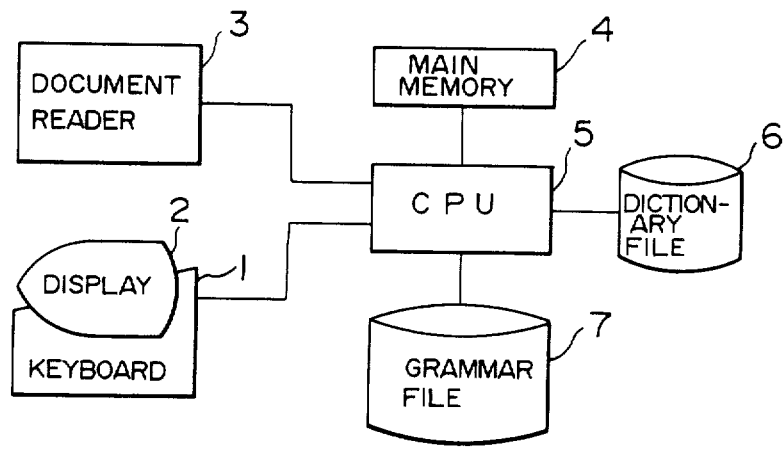
FIG. 2 is a view showing a general arrangement of a machine translation system according to an embodiment of the invention.

FIG. 2 is a view showing a general arrangement of the machine translation system according to an embodiment of the present invention.

In the figure, a reference numeral 1 denotes a keyboard for inputting information of a first natural language, 2 denotes a display device for displaying inputted sentences or text, the results of translation and other data, 3 denotes a document reader for inputting the source text, 4 denotes a main memory storing a variety of information, 5 denotes a central processing unit or CPU, 6 denotes a dictionary file storing words of first and second natural languages in a correspondence relation, and a numeral 7 denotes a grammar file for storing sets of grammar rules in dependence on the domains of the text to be translated and the parts of the text.

FIG. 3 shows structures of the keyboard 1 and the display device 2 shown in FIG. 2.

The keyboard 1 includes character keys 1a used for inputting character codes upon inputting of a text or sentences, function keys 1b (including a start key $1b_1$) used for inputting those codes which command selectively the functions required upon inputting of the source text through the document reader 3 or in performing the translation, and a position command key 1c for designating the location of the content read by the document reader 3 on the display device 2. On the other hand, there are displayed on the display device 2 an inputted source text containing the title or headline, the abstract, ordinary sentences, a picture and other data.

Figure 4:
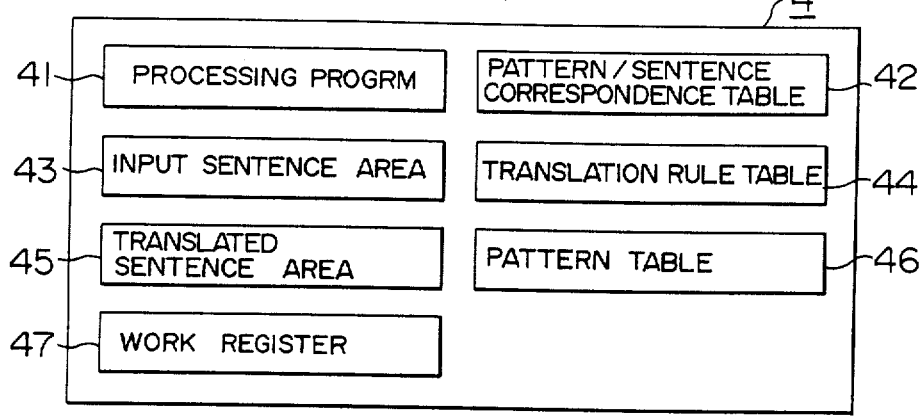
FIG. 4 is a view showing a layout of area allocation in a main memory of the system shown in FIG. 2.

FIG. 4 is a view showing a layout of area allocation in the main memory 4 shown in FIG. 2.

As will be seen in this figure, the main memory 4 includes a processing program 41 for executing an algorithm for the translation, a pattern-versus-sentence correspondence table 42 indicating the sentences associated with the parts of the document read through the document reader 3, an inputted text area 43 for storing the inputted source text, a translation rule table 44 for translating the inputted source text, the table 44 being constituted by selectively collecting only the appropriate grammar rules (or rule identifying numbers) from the grammar file 7 in dependence on the domain of the object and the constituents of the text, a translated text storing area 45 for storing the translated text to be outputted, a graphic or pattern table 46 storing correspondence relations referred to upon determining the area in the text to be allocated for the picture, and a work register 47.

Next, the processing operation of the translation system according to the instant embodiment will be described.

At first, the user depresses the start key $1b_1$, whereupon the CPU 5 activates a processing program 41 which executes by and large the two processings mentioned below.

(I) Cutting-out of units to be translated and recognition of the object of the cut-out units as well as the roles in the text or document.

(II) Execution of translation in accordance with recognition of the object and the role in the text.

In the following, the processings (I) and (II) classified above will be described in detail.

(I) Cutting-out of the units to be translated and role recognition

The term "unit" used in conjunction with the text to be translated generally means a sentence (i.e. a unit bounded by ".", "?" or the like mark). However, in the case of a fragmental character string such as the headline of news item, a character string inserted in the graphic pattern, the name of author and the like, the unit in the sense defined above can not be determined definitely. However, these fragmental character strings are handled as a sentence corresponding to the unit to be cut out or extracted.

The operation for cutting out one sentence may be effectuated by inputting the sentence on a character basis by pressing the character keys 1a of the keyboard 1 or alternatively through the document reader 3, although there exists some difference in the processing between the inputting through the keyboard 1 and the inputting through the document reader 3. More specifically, in the case of inputting through the keyboard 1, a presumption that "a character string without a punctuation mark is considered as a sentence corresponding to the title or headline when the line remains blank following the ending word of the string" is adopted with the line and the punctuation mark being used as the clue. On the other hand, in the case of inputting through the document reader 3, the extent of one sentence as well as the role thereof in the document can be frequently determined on the basis of the size, the type and the style of characters as well as the positional relation and the setting relative to a graphic table, picture or the like. For the recognition of this sort of unit or sentence, there may be adopted various methods. However, the invention is not restricted to any specific method. As an example, FIG. 5 illustrates in a flow chart a recognition processing method carried out through interaction with the user.

Figure 5:
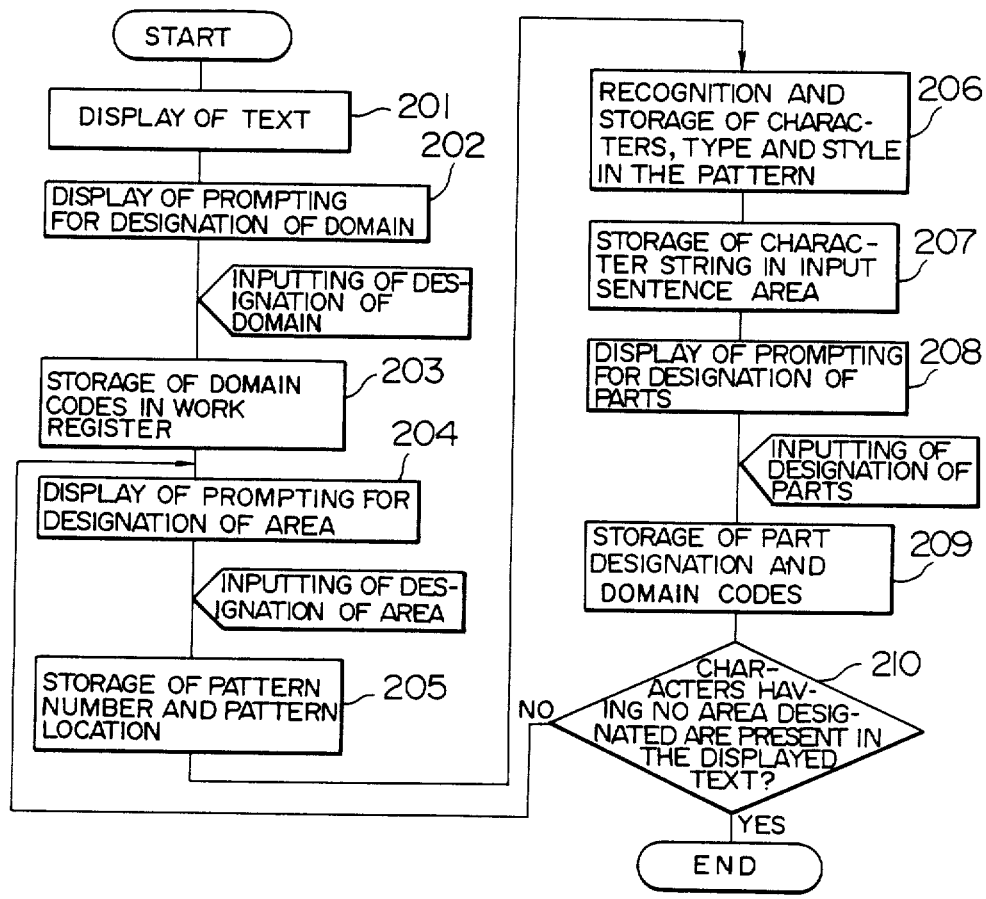
FIG. 5 is a view illustrating in a flow chart a processing for obtaining information concerning the relevant domain to which a text to be translated belong and parts of the text from the user.

Referring to FIG. 5, a sentence inputted through the document reader 3 is displayed on the display device 2 (step 201). Subsequently, a prompt is displayed to the user, requesting his or her designation of the domain to which the sentence being displayed belongs (step 202). To this end, an audible prompting may be alternatively produced. In response, the designation data is inputted through the keyboard 1 by the user and stored in the work register 47 (step 203). Subsequently, a prompt is displayed which requests the user to designate the area of the unit to be translated in the text (hereinafter, the unit is also referred to as the pattern) at a step 204. When the area is designated, the pattern is attached with a pattern number (identification number) and stored in the graphic or pattern table 46 together with the location in the text (step 205). After the pattern has been selected through the procedure described above, the characters of the character string contained in the pattern as well as the type and style of the characters are recognized and affixed with a sentence number to be registered in the pattern/sentence correspondence table 42 in correspondence relation to the pattern number (step 206), while the sentence is stored in the input sentence area 43 in terms of character codes (step 207). Since the type and the style of the character may differ on a word basis or on a character basis, it is desirable to retain the difference by employing the correspondingly different character codes. In this connection, the attributes of the characters such as the type and style may be stored in the pattern/sentence correspondence table 42 in view of the graphic attributes of the ornate character. Next, a prompt is displayed requesting the user to input data concerning the location of the designated pattern in the whole text (step 208). The location data or information thus inputted is stored in the pattern/sentence correspondence table 42 (step 209). Subsequently, it is checked whether characters for which the area remains undesignated are present in the text being displayed (step 210). If present, the prompting step (204) for the area designation is regained. Otherwise, execution of the processing comes to an end.

Figures 6, 7:
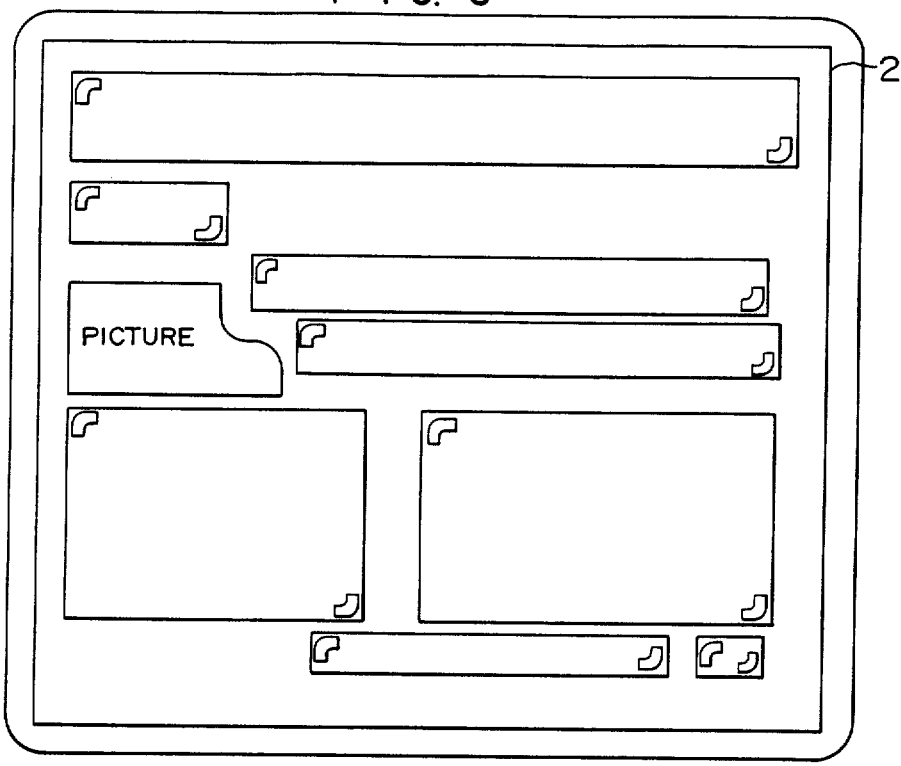
FIG. 6 is a view illustrating an example of information inputted under designation of the user through the processing illustrated in FIG. 5.
FIG. 7 is a view showing, by way of example, classifications of the domains to which the object of the text to be translated belong and classification of parts of the text.

FIG. 6 shows, by way of example, the result of the processing illustrated in FIG. 5 executed on the exemplary text displayed on the display device 2 shown in FIG. 2. In FIG. 6, a symbol "⌐" designates the upper left corner of each pattern area while "⌐" designates the lower right corner. Further, FIG. 7 shows, by way of example, classification of domain and parts, and the associated codes, wherein "periodical or magazine" or the like is a sort of auxiliary information for helping the user input the designation of the domain, and "domain, subdomain, or title" or the like is the auxiliary information for inputting the designation of "part".

FIG. 8 is a view showing, by way of example, a table structure for the pattern/sentence correspondence table 42 according to the embodiment of the invention. It will be seen that the pattern/sentence correspondence table 42 stores therein the information or data resulting from the processing described hereinbefore in conjunction with FIG. 5.

In FIG. 8, a column 421 contains the pattern numbers of the patterns inputted through the document reader 3. A column 422 contains the point numbers indicating the sizes of characters. A column 423 contains the data of the character styles (in which B represents the boldface and E represents the elite). A column 424 contains the sentence numbers. A column 425 contains the objects (also refer to FIG. 7). A column 426 contains the information of the parts (see FIG. 7). The graphic attribute is determined by the point number 422 and the style 423, while the sentence attribute is represented by the domain 425 and the part 426.

Information of the style 423 such as the boldface B or elite E may be determined by the document reader 3. The information of "domain" and "part" (i.e. sentence attributes) is made use of in the case where they are automatically determined by the processing program unless they are designated by the user. The numerals contained in the "domain" column 425 and the "part" column 426 conform to the classification shown in FIG. 7. For example, the numeral "4" contained in the "sentence number" column 424 shown in FIG. 8 indicates "subtitle" of "an article".

When the units for translation (which are assumed to be "sentences", by way of example, and will also be referred to as the sentence) have been cut out with the information of "domains" and "parts in the text" having been stored, then each of the sentences is translated with the aid of the set of grammar rules which are so prepared that the number of the rules can be reduced to the minimum.

(II) Execution of translation and display of the translated sentence

FIG. 1 illustrates in a flow chart the processing for executing the translation and the display of the sentence resulting from the translation. The processing illustrated in FIG. 1 constitutes a part of the processing (I) (for the cutting-out of the units to be translated and recognition of the domains and the parts). The following description will be made by reference to FIG. 1.

Figures 10, 11:
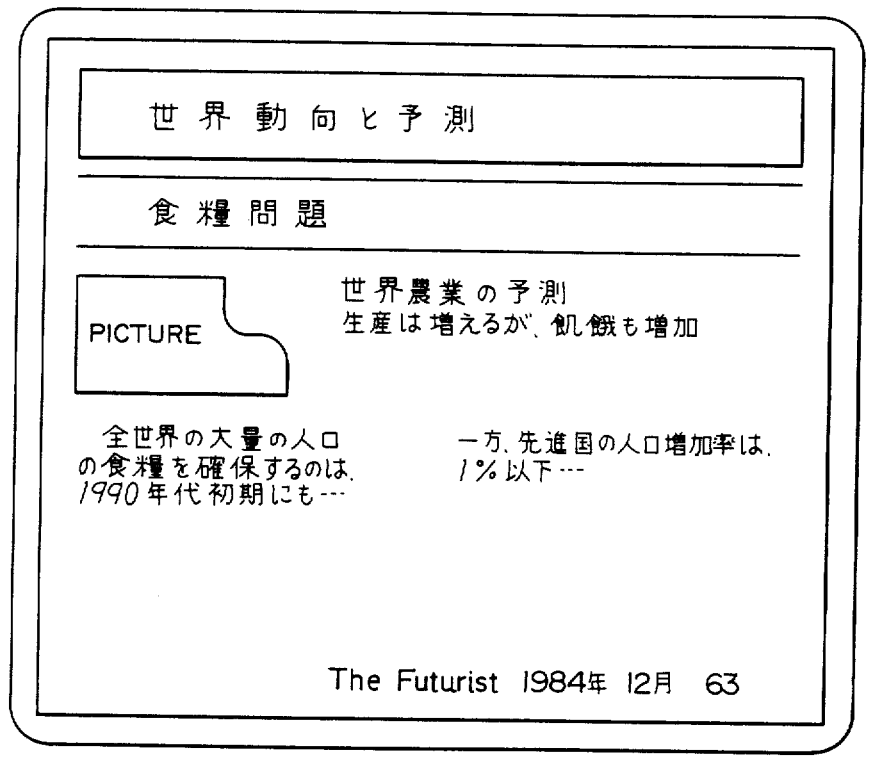
FIG. 10 is a view showing, by way of example, a set of grammar rules established in dependence on the domain of the subject matter of the text for translation and the parts thereof.
FIG. 11 is a view showing an example of display of the result of translation of the text shown in FIG. 3.

In the first place, "domain" and "part" are recognized (at step 101), and the relevant and appropriate grammar rules are established in accordance with the information of "domain" and "part" (step 102). To this end, all the grammar rules may be previously established and stored in a file, wherein the applicable rules are selected in accordance with the information of "domain" and "part". It is however preferred that the grammar rules be previously tabulated in correspondence with "domains" and "parts" for more convenience' sake. FIG. 9 shows, by way of example, the contents of the grammar file 7 and FIG. 10 shows, by way of example, a table of rules indicating which grammar rule in the grammar file 7 should be applied in the translation. The rule table may be stored in the grammar file 7 or alternatively stored in the main memory 4 as a table or as a part of the work register 47.

The results of the selective establishment of the appropriate grammar rules (i.e. the result of the step 102) are stored in the translation rule table 44. In that case, the corresponding rules contained in the grammar file 7 may be copied to the translation rule table 44 as they are or alternatively only the codes representative of the grammar rule numbers may be stored in the translation rule table 44, wherein the grammar file 7 is referred to in accordance with the codes for retrieving the appropriate grammar rules to be applied to the actual translation.

Next, translation is performed by consulting the translation rule table 44 (step 103). To this end, a method disclosed in Japanese Patent Unexamined Publication No. 56-138586 of the inventors of the present application, although the invention is not restricted to any particular method. The sentences resulting from the translation should preferably be displayed on the display unit 2. However, in the case where the translation is of an enormous amount and does not require the confirmation by the user, the result of the translation may be outputted through a photographic type-setting machine or the like. When the inputting of the text is performed with the aid of the document reader 3, the sentence resulting from the translation should desirably be displayed so as to conform with the graphic attributes (the point number 422 and the style 423) of the source text. In that case, when the translated sentence is longer than the source sentence, the length of the translated sentence may be adjusted, by preparing previously such rules in the translation rule table 44 which can shorten the sentence without altering the meaning or content thereof or by adjusting the size of the characters so that the output text of the pattern similar to that of the source text may be obtained. FIG. 11 shows an example of the results of translation of the sentences shown in FIG. 3.

As will be appreciated from the foregoing description, there can be realized according to the present invention a convenient translation machine of improved processing efficiency and high disambiguation rate in which the rules appropriate to the translation is decreased to the minimum number by exchanging the rules for the individual translations in view of the fact that the rules appropriate to the translation differ in dependence on the sentences to be translated and that the sentences in a same text may play different roles in dependence on the parts (locations) in the document. Although the description has been made on the assumption that the text described in English is translated to Japanese, it should be appreciated that the invention can be equally applied to Japanese-to-English translation or abstraction of a text by collecting only the important portions (e.g. collecting only the bodies with modifications being omitted).

It will be now be understood that according to the invention, the translation can be effectuated with an improved processing efficiency with the rate of disambiguation in the parsing being increased by applying different grammar rules in dependence on the domains to which the texts to be translated belong, the parts of the texts and the rules of the sentences in one and the same text.

Next, another embodiment of the language translation system of the invention will be described with reference to FIGS. 12 to 15. An English-Japanese language translation system will be described by way of example in the following. However, the invention is also applicable to translation of other languages, and to natural language processing other than translation.

FIG. 13 is a block diagram showing another embodiment of a translation system of this invention.

Referring to FIG. 13, a reference numeral 11 denotes an input/output device for inputting a first language, information for renewing the information of a control table, and other data, 12 denotes a display device for displaying translated sentences, the information of the control table, and other data, 13 denotes a control unit for controlling input in the first language, displaying the information of the control table, acknowledging the renewed information by the user and renewing the control table, executing translation by selecting most suitable items in a dictionary file and a common-sense base file in accordance with the information of the control table, and displaying the translation result, 14 denotes the control table to be referred to in performing a translation, 15 denotes a translation unit storing data in terms of objects, 16 denotes the dictionary file storing data in terms of domains and texts, and 17 denotes the common-sense base file to be referred to in realizing a profound meaning processing.

The control table 14 stores information regarding translation means and the object to be translated, the information being concerned with a dictionary, input means, domain characteristic of a text to be translated, and the like. The control table 14 comprises an environment table 141 and a strategy table 142 for storing translation strategies.

Figure 12:
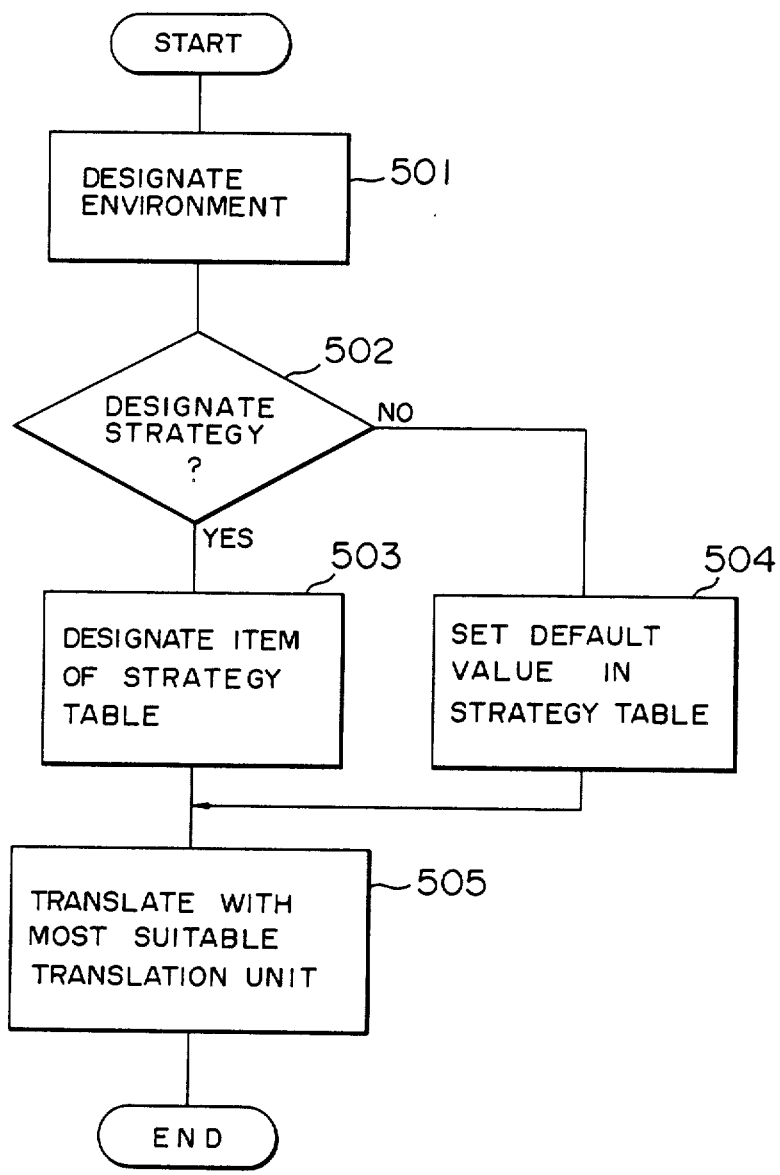
FIG. 12 is a flow chart of a processing by a translation system in accordance with another embodiment of the invention.

The processing by the language translation system of this embodiment will be described with reference to FIG. 12. Prior to starting translation, the user first designates information such as a characteristic of a text to be translated, input means, and a dictionary to be used (the information is called environment information) (step 501). An example of the environment information is shown in FIG. 14. The characteristics of a text include a field and a type of a text. For instance, a word "compile" has two meanings, one being "to gather documents" and the other being "to translate a program into a machine language or others". It is natural and probable to distinguish between these two meanings based on a difference between fields of an object text rather than based on a difference between meanings, e.g., of "leave" which has two meanings of "to go away" and "to cause to remain" (disambiguation for the two meanings of "leave" cannot be presumably eliminated based on a difference of fields only). As input means, there are a voice-input unit, an optical character reader (OCR) and the like. OCRs include those types inputting texts in units of characters, words, or in unit of paragraphs or texts in the form of files. The information on input means is used in selecting, as an analysis method, a voice recognition analysis method for processing in parallel based on a definite part or a sequential processing method for processing starting from the top of a sentence in units of words, or is used in checking the availability of a method for analyzing a sentence starting from the end thereof if a paragraph or a text as a whole can be referred to, or in checking if an effective method can be selected. The information on dictionary is used by the user for designating a dictionary belonging to a particular field, or one of dictionaries of the same field containing meanings to a certain profound or having a particular usage.

After designation of the environment information, a strategy is next designated (step 502). In order to use the strategy table 142, the control unit 13 causes the contents thereof to be displayed on the display device 12 to allow the user to designate a strategy (step 503). If there is no designation by the user, the control unit 13 causes a predetermined default value to be stored in the strategy table 142 (step 504).

An example of the strategy table 142 is shown in FIG. 15. As strategies to be stored in the strategy table 142, it is effective to use not the dictionary data or the translation rules themselves but guide indexes indicative of how to use them. The guide indexes described hereinunder include (1) speed/quality, (2) dictionary field, (3) rule limitation, (4) meaning processing level, (5) disambiguation result display, (6) consideration of correspondence anaphoric, and (7) use of common-sense base.

(1) Speed/Quality

If the user takes prominence to translation speed, the following rules may be adopted to improve translation speed.

Only a set of rules of sentence structures is used (e.g., if structural attributes such as a part of speech, number, gender and case, and a rewriting rule alone are used, the translation speed becomes very fast).

An assumptive rule is used (e.g., assuming that a principal verb is not omitted, a principal verb is first identified to judge a word before it as a subject-word and a word after it as an object-word). This method enables a high speed translation as compared with a rewriting rule simply adopted in translation wherein the rule is sequentially and properly applied to a sentence from the start to the end thereof with consideration of every possible situation. However, this method is subjected to a danger of erroneous translation.

A method is used wherein an item listed at the top of a dictionary is used neglecting the ambiguities of the dictionary (e.g., assuming that a word having a plurality of parts of speech has only a part listed at the top of dictionary, the translation speed is improved due to unnecessity of using a rule eliminating ambiguities of plural parts of speech, or other rules).

Alternatively, if the user takes prominence to translation quality, a rule adopting such as a meaning processing and the common-sense base is used, and a precise dictionary with limited meanings is used. In this case, although the translation speed lowers, the translated text becomes of high quality.

(2) Dictionary Field

If an object text has a particular field (which may be classified into more finer fields such as sentence characteristics and the like), it is effective to designate a dictionary to be used exclusively to such a particular field. The above-discussed word "compiler" belongs to a computer field, whereas a term "operation" means "surgical operation" in medical field and "arithmetic operation" in mathematics field. Therefore, in some cases it is effective to selectively use a dictionary or an item of a dictionary based on a domain rather than limited meanings.

(3) Rule Limitation

In limiting rules, only the domain of a dictionary may be designated without limiting rules even in case translation speed is desired to be improved at the designation of (1) Speed/Quality. On the contrary, some of rules may be limited to improve the translation quality. For instance, if a text writer is considered to have a writing style using omission and inversion which makes it difficult to parse the text, the user may intentionally designate those rules constructed on such assumption without using omission and inversion, to thereby obtain a good translation at high speed and high quality (to result in less erroneous translation due to nervous consideration of ambiguities). It is convenient to perform such designation by determining beforehand a level or the like, or by explicitly setting the rules to be used.

(4) Meaning Processing Level

It is necessary to designate the meaning processing by using several levels which consider the following conditions. Namely,

- a limitation of rules of sentence structure based on meaning classification codes (e.g., "leave"+noun representing a place means "go away", "leave"+noun representing a money means "deposit as an inheritance" or "mislay a money"),
- a recognition of a case as to depth of consciousness (e.g., Tokyo in "leave Tokyo" is a place case, him in "give him a book" is an assignee case and book thereof is an object case), and
- an understanding of a context of sentences and its situation (e.g., without analyzing the preceding sentences or the situation of conversation, "He was moved with them" can not be definitely grasped or translated as to whether the sentence means "he was caused to change his place by other persons" or "he was stirred with emotions by pictures or movies". In order to correctly translate it, who are "them", which meaning has "move", and who is "He" must be understood).

However, if it is apparent that in some particular case of using "move", it has only the meaning of "change of place", then a good translation may be obtained without using a meaning processing.

(5) Disambiguation Result Display

Ambiguities in translation may occur in dependence of various levels such as sentence parsing levels and meaning processing levels. If it is designated by the user which level the disambiguation result is to be displayed (including such a method as a displaying the ambiguities themselves, e.g., other results, parts of speech and the like), it becomes possible to avoid adopting an unnecessary disambiguation rule which has no effect upon an outputted text or the like.

(6) Consideration of Anaphoric Correspondence

This correspondence consideration is designated for the meaning level stated in (4) if the correspondence particularly among sentences is to be considered (such as who is "He", which verb corresponds to "do", and the like). Analyzing the correspondence between sentences requires a large amount of resources such as analysis time, memory capacity for the processing, and besides there are ambiguities in such correspondence. Therefore, there arises a risk of erroneous translation. The user decides if such correspondence consideration is to be designated in a translation processing while taking account of such a risk.

(7) Common-sense Base

In case of the correspondence or the omission, an incorrect analysis may occur, unless using the limited meaning characteristic to a word, as well as considering the nature of things, the knowledge of inevitability in some field, or the physical realization. For example, if the following two sentences are given;

"He went to see the movie 2010 last night." and

"He was moved by it very much.", a sophisticated translation of "move" into "stirred with emotions" is possible by using a common-sense that "a man is stirred with some emotion when seeing movies or the like". To fill missed information in case of the omission, the common-sense base is essential for some cases. For instance, it is assumed a sentence "Soviets Blame Local Officials Over Chernobyl." is given. In this case, as a method of understanding the word "Over" as meaning not "passing through or behind a place" but "with respect to", a method may be considered wherein the understanding is obtained through a sentence structural pattern of "blame . . . over". However, another method may be adopted using a reduction that "an organization blamed someone" and "if someone was blamed, there is some problem or some reason for such blame", wherein a translation of "Chernobyl" into "Chernobyl Problem" can be obtained with adding a missing "Problem" thereto, or further by supposing "the reason why a mischievous accident of a nuclear reactor at Chernobyl occurred", a translation of "Chernobyl" into "Chernobyl Problem" or "Chernobyl Accident" can be obtained. However, it becomes essential for the above processing to have a reduction mechanism analogous to man and flexible use of human knowledge. Therefore, it becomes effective for the user to designate to what extent the common-sense base is to be used, by considering the degree of completion of the common-sense base, the levels of rules, the peculiar characteristic of an object text (e.g., frequent omission), the requirements for translation (e.g., a draft translation is needed), or the like.

After designation of the above strategy information by the user, a translation is performed by selectively using most suitable translation units in accordance with the control table (including the strategy table and the environment table) (step 505). A method may be used wherein a single translation unit is used and the control table is checked every time different rules are adopted. However, the control table cannot cover all the combinations used by the method so that it is desirable to adopt another method wherein the combinations are classified into characteristic categories and only the remaining items outside of the categories are checked every time different rules are adopted (e.g., such a single translation unit may be used that uses rules with limited meaning codes and a dictionary of a particular domain but does not use the common-sense base).

The designation of the environment information (step 501) is not necessarily needed to be made by the user, but it may be designated by a stored default value in a similar manner to step 504.

According to the above-described embodiment of this invention, it is possible to realize a translation system of high efficiency and in conformity with the user requirements, by dissolving a problem of a hardship in realizing a totally complete translation system due to the differences of the characteristics of input texts, the degrees of completion and the characteristics of dictionaries and rules to be adopted, the view points on which users lay particular emphasis, and by dissolving a problem of a possibility of performing excessive analysis by the totally complete translation system due to its high efficiency.

We claim:

1. A language translation system in a machine-translation system for translating a first language into a second language, comprising:
    a memory for storing sets of grammar rules of at least one of said first and second languages, wherein each of said sets of grammar rules stored in said memory corresponds to a domain to which content of at least one text to be translated belongs and a part of said one text;

means for selecting one set of said grammar rules to be used to translate a text written in said first language into a second language, according to a domain to which said text written in said first language belongs and a part of said text; and means for translating said part of said text into another text written in said second language by using said one set of said grammar rules selected by said selecting means.

2. A language translating system according to claim 1, further comprising inputting means for inputting a designation of said domain to which said text belongs and a designation of said part of said text.

3. A language translating method in a machine-translation system for translating a first language into a second language by using a memory for storing sets of grammar rules of at least one of said first and second languages, comprising the steps of:

inputting information of a domain to which a text to be translated belongs and a designation of a part of said text;

selecting one of said sets of said grammar rules stored in said memory to be used to translate said text written in said first language into another text written in said second language in response to said inputted information of said domain and said inputted designation of said part of said text; and translating the said part of said text by using said one set of grammar rules selected at by said selecting step.

4. A language translating system for translating a first language into a second language comprising:

a file having stored therein a plurality of sets of rules grouped based on texts and domains of said texts;

a plurality of translation units having stored therein data in terms of objects of various texts;

inputting means for inputting information regarding a strategy upon which a user lays an emphasis in order to translate a text at high speeds and high quality;

selecting means for selecting a set of rules from said file and for selecting a translation unit in response to said information inputted by said inputting means; and translating means for translating said text written in said first language into another text written in said second language using said selected set of rules and said selected translation unit.

5. A language translating system according to claim 4, wherein said information regarding said strategy includes at least one of speed/quality, dictionary domain, limitation of rule, meaning processing level, disambiguation result display, consideration of correspondence, and use of common-sense base.

* * * * *